(12) United States Patent  
Fisher

(10) Patent No.: US 7,941,928 B2  
(45) Date of Patent: May 17, 2011

(54) CLIP-HANDLE SCISSORS

(76) Inventor: John Anthony Fisher, Richland, WA (US)

( * ) Notice: Subject to any disclaimer, the term of this patent is extended or adjusted under 35 U.S.C. 154(b) by 0 days.

(21) Appl. No.: 12/458,229

(22) Filed: Jul. 6, 2009

(65) Prior Publication Data

US 2009/0271987 A1    Nov. 5, 2009

Related U.S. Application Data

(63) Continuation-in-part of application No. 11/802,383, filed on May 23, 2007, now abandoned.

(51) Int. Cl.
*B26B 13/16* (2006.01)
*B26B 13/20* (2006.01)

(52) U.S. Cl. .................. 30/262; 30/254; 30/261

(58) Field of Classification Search ........... 30/123, 30/231, 232, 254, 262, 271, 261; 606/174; D8/5, 57, 107; D24/148
See application file for complete search history.

(56) References Cited

U.S. PATENT DOCUMENTS

| | | | | |
|---|---|---|---|---|
| 98,826 | A * | 1/1870 | Wendt | 30/259 |
| 1,915,450 | A * | 6/1933 | Maximilian | 30/262 |
| 1,962,737 | A * | 6/1934 | Gutmann | 30/173 |
| 2,650,423 | A * | 9/1953 | Phillips | 30/261 |
| 2,749,615 | A * | 6/1956 | Griffon | 30/262 |
| 3,765,087 | A * | 10/1973 | Pawloski | 30/228 |
| 4,152,831 | A | 5/1979 | Davies | |
| 4,407,069 | A * | 10/1983 | Conners | 30/254 |
| 4,776,094 | A * | 10/1988 | Glesser | 30/160 |
| 4,936,499 | A | 6/1990 | Gulley | |
| D321,818 | S | 11/1991 | Hasegawa | |
| 5,101,563 | A * | 4/1992 | d'Orgelys | 30/28 |
| 5,421,498 | A | 6/1995 | Menoni | |
| 5,531,365 | A | 7/1996 | Donnelly | |
| D372,783 | S | 8/1996 | Rollert | |
| 5,628,115 | A * | 5/1997 | Hebert | 30/262 |
| 5,743,450 | A | 4/1998 | Plate | |
| 5,996,236 | A * | 12/1999 | Branting | 30/366 |
| 6,079,758 | A * | 6/2000 | Romero et al. | 294/25 |
| 6,096,046 | A * | 8/2000 | Weiss | 606/119 |
| 6,223,372 | B1 | 5/2001 | Barbera | |
| D459,642 | S | 7/2002 | Haquin | |
| 6,533,151 | B1 | 3/2003 | Link | |
| 6,594,906 | B1 * | 7/2003 | Sakai et al. | 30/155 |
| 6,598,300 | B2 * | 7/2003 | Huang | 30/262 |
| 7,000,323 | B1 * | 2/2006 | Hatcher et al. | 30/155 |
| D519,010 | S | 4/2006 | Oas | |
| 7,111,349 | B2 | 9/2006 | Goldberg | |
| D529,362 | S | 10/2006 | Barber et al. | |
| D533,427 | S | 12/2006 | Barber et al. | |
| D533,760 | S | 12/2006 | Kelleghan | |
| D534,953 | S | 1/2007 | Kramer | |
| D540,648 | S | 4/2007 | Junck | |
| D549,335 | S | 8/2007 | Junck | |
| 2002/0138990 | A1 * | 10/2002 | Gluck et al. | 30/258 |
| 2009/0277019 | A1 * | 11/2009 | Mueller | 30/262 |

* cited by examiner

*Primary Examiner* — Hwei-Siu C Payer

(74) *Attorney, Agent, or Firm* — Antony C. Edwards

(57) ABSTRACT

A pair of scissors having a pair of looped handles has a clip such as a carabiner-style inwardly-opening gate mounted on the outer-most perimeter of one or both of the looped handles. Where the clip is a carabiner, the distal end of each gate, distal from the gates hinge, is oppositely disposed relative to the fulcrum of the pair of scissors. The non-gate portion of each of the looped handles containing a gate includes a hooked portion adjacent the distal end of each gate. The hooked portion includes a stop to limit movement of the gate. A resilient loop is mounted around the levers of the scissors between the handles and fulcrum so as to urge the scissors closed.

3 Claims, 10 Drawing Sheets

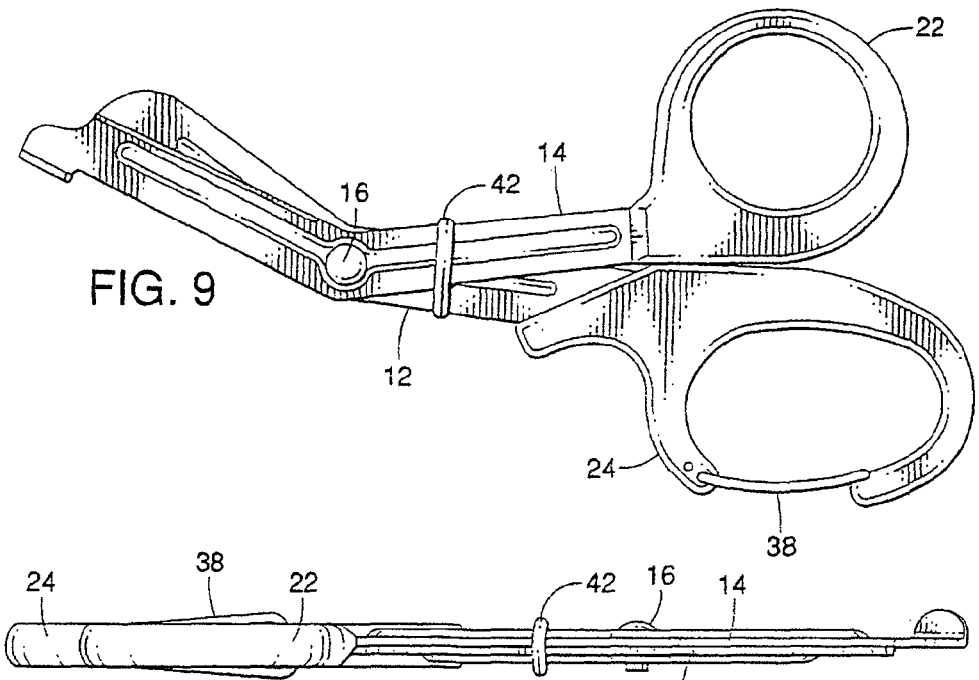
FIG. 9
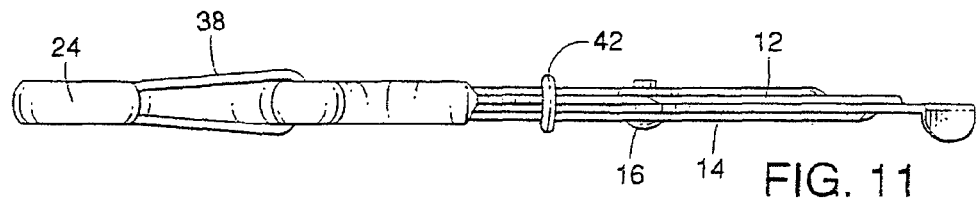
FIG. 10
FIG. 11
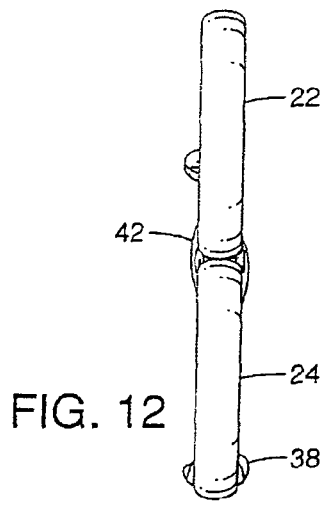
FIG. 12
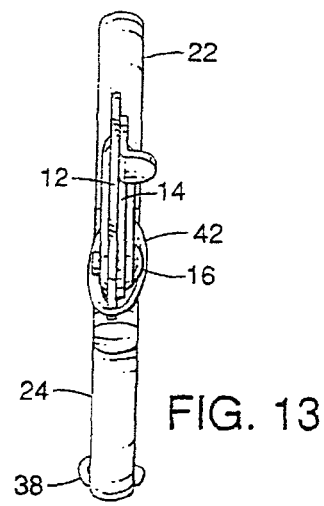
FIG. 13

CLIP-HANDLE SCISSORS

CROSS REFERENCE TO RELATED APPLICATION

This application is a continuation-in-part of U.S. patent application Ser. No. 11/802,383 filed May 23, 2007 entitled Carabiner-Handle Scissors, now abandoned.

FIELD OF THE INVENTION

This invention relates to the field of scissors, shears and like double-handled pivotally coupled knife-blade pairs, collectively referred to herein as scissors, and in particular to an improvement to same wherein a clip such as a carabiner is incorporated into at least one of the handles and the handles and blade pair are resiliently urged closed.

BACKGROUND OF THE INVENTION

Scissors are key pieces of equipment for medical personnel including but not limited to emergency medical response, rescue and veterinary professionals. In many instances, the scissors utilized by such medical personnel have been developed for specific applications such as emergency medical technician ("EMT") shears, bandage and veterinary scissors. EMT shears, for example, are designed to cut through heavy fabrics such as denim or seatbelt material. Veterinary scissors, another type of specialized scissors, having one smooth blade and one serrated blade, are designed for cutting through cartilage and soft bone.

Scissors are often used by medical personnel in situations which, unlike a hospital operating room, are not conducive to the scissors being set down. If, for example, a rescuer in the midst of treating an injured hiker and preparing for him to be evacuated from a cliff overhang, sets down his scissors on the rocks, they may tumble and be lost. By way of another example, it would, in most instances, be ill-advised for a veterinarian treating a horse for a hoof abscess to set down her scissors on the ground. The laying of the scissors in close proximity to the equine could easily result in harm to the horse, the veterinarian or both.

In addition, in the corresponding examples noted above, it may well be of critical importance to the attending medical personnel that the scissors be readily to hand when needed. If an EMT attending on a car accident scene has, for example, used his scissors to cut the driver's seatbelt and, having nowhere to place the scissors, he sets them on the dash or places them into his pocket they may not be readily retrievable when the attending medical professional may have only one hand free with which to access then re-store the scissors.

SUMMARY OF THE INVENTION

Trauma shears are awkward to carry because they are bulky. They don't fit well in pockets, and as a result, medical personnel do not carry them and are often looking for them when they should be paying attention to their patient. However, using the present invention the user can carry a pair of clip-handle scissors for example hooked to the waist of their hospital scrubs, clipped to the side of stretchers, or clipped to cables in the emergency room or operating room or clipped to emergency vehicles and equipment. In the preferred embodiment, the scissors while clipped or hung by their handles do not swing open, that is, the blades do not inadvertently open leaving their sharp edges exposed, as a resilient biasing loop such as a resilient O-ring is mounted around the stems of the handles, that is between the handle loops and the scissor pivot joint between the blades.

In summary, the present invention may be characterized in one aspect as a clip-handle scissor which includes conventional scissor blades, that is, substantially linear elongate first and second levers mounted one to the other by a pivot joint so as to form a fulcrum substantially mid-way along their lengths, and wherein a first end of the levers are formed as shearing blades and wherein the second ends are formed as looped handles mounted on the ends of corresponding stems. The levers have cutting edges along opposed facing edges of the first and second levers respectively for shearing engagement of one of the cutting edges over the other as the levers are rotated relative to one another about the pivot joint between an open position wherein the cutting edges form a V-shaped nip for receiving in the nip an object to be cut, and a closed position wherein the cutting edges substantially overlap one another so as to close the nip along the length of the blades. The looped handles are formed as a pair of loops lying substantially adjacent a plane common with the cutting edges and containing a plane of rotation of the levers when rotated about the pivot joint. The resilient loop is mounted tensioned around the first and second levers mid-way along the stems, between the looped handles and pivot joint, so as to seat the loop in a corresponding pair of notches formed in the opposite edges of the first and second levers. Advantageously the notches are no greater in depth than substantially one half of the thickness of the loop so that the loop may be urged from where it is seated in the notches by the fully rotated opening of the scissors to thereby cause the loop to roll down the stems to a position immediately adjacent the pivot joint.

Where the clip in the handle loop of the scissors is a carabiner, a gate is formed in at least one of the loops and adapted for rotation about a hinge on a corresponding loop for opening of the gate only inwardly of the loop against a return biasing force of a resilient biasing means such as a spring cooperating with the gate to resiliently urge the gate into a closed position against a stop formed in the loop. When the gate is closed the loop forms a contiguous surface surrounding an inner circumference of the loop. When open, the gate forms an opening into the loop through a discontinuity in the looped handle. The gate is opened by being resiliently urged inwardly of the loop into its open position against the return biasing force. The return biasing force closed the gate when it is released.

In one embodiment each loop of the pair of loops includes a first bearing member and a second bearing member. The first and second bearing members are disposed oppositely to each other on each loop. The first bearing members are substantially closely adjacent when the levers are in the closed position. The second bearing members are thereby spaced apart by substantially only the pair of loops. At least one gate is formed in at least one of the second bearing members.

As in conventional scissors a first loop of the pair of loops is adapted to only receive in sliding engagement journalled therethrough a thumb of a first hand of a user and a second loop of the pair of loops is adapted to receive in sliding engagement journalled therethrough at least two fingers of the first hand of the user. In one embodiment of the present invention the gate is only formed in the second loop.

The gate may include an elongate gate member pivotally mounted to a shank of its corresponding loop by a hinge. The hinge is disposed on a side of the gate opening closest to the fulcrum so that a distal end of the gate member distal from the hinge is disposed oppositely from the fulcrum about the hinge.

BRIEF DESCRIPTION OF THE DRAWINGS

FIG. 9 is, in left side elevation view, the scissors of FIG. 7.

FIG. 10 is, in bottom view, the scissors of FIG. 7.

FIG. 11 is, in plan view, the scissors of FIG. 7.

FIG. 12 is, in handle-end view, the scissors of FIG. 7.

FIG. 13 is, in blade-end view, the scissors of FIG. 7.

DETAILED DESCRIPTION OF EMBODIMENTS OF THE INVENTION

In the accompanying figures similar characters of reference denote corresponding parts in each view.

Clip-handle scissor 10 includes substantially linear elongate first and second levers 12 and 14 respectively mounted one to the other by a pivot joint 16 so as to form a fulcrum or pivot substantially mid-way along their lengths $L_1$ and $L_2$ respectively.

Figure 1:
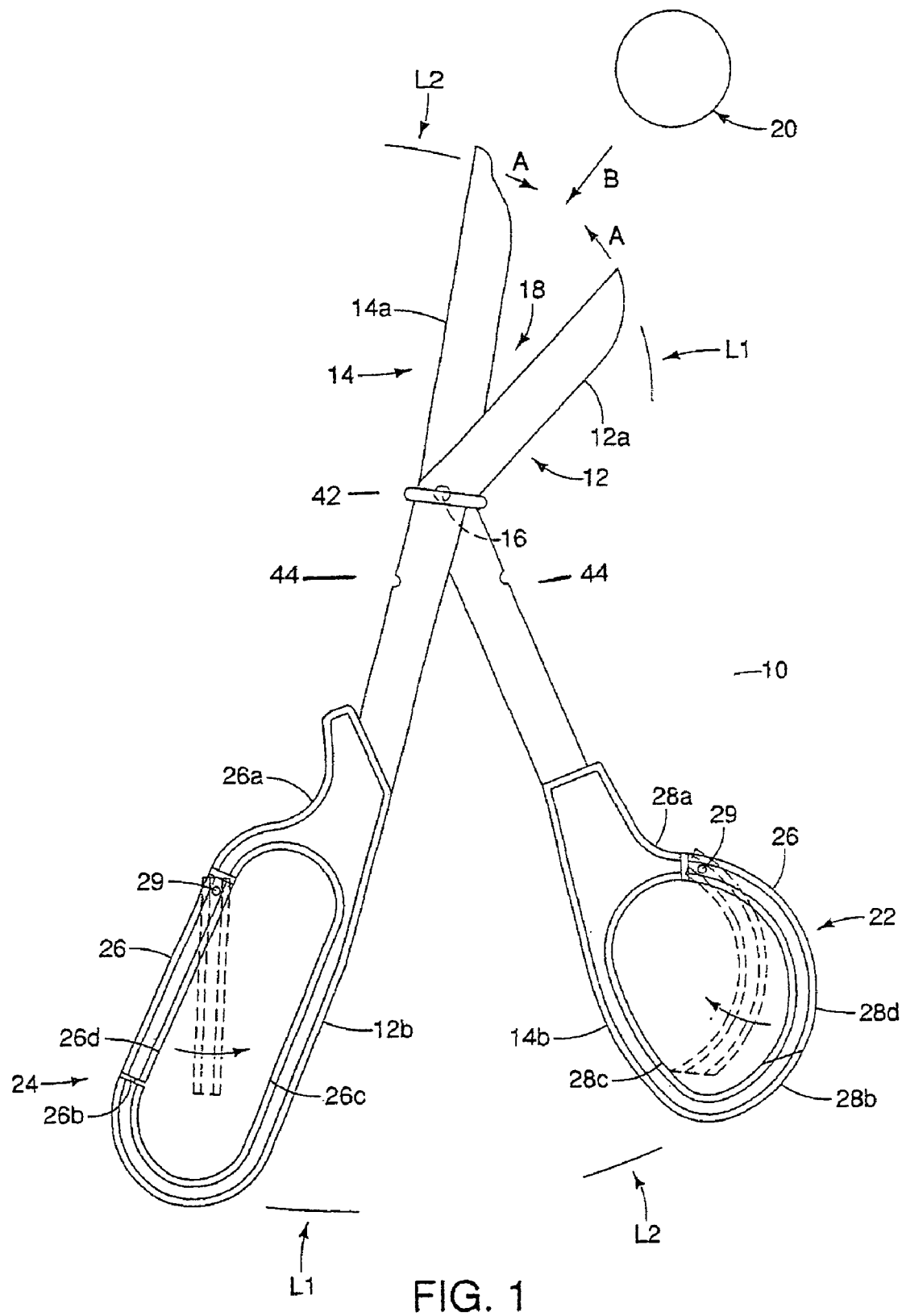
FIG. 1 is, in front elevation open position view, a pair of scissors according to one embodiment of the present invention incorporating an oppositely disposed pair of carabiners in the handles.
Figure 2:
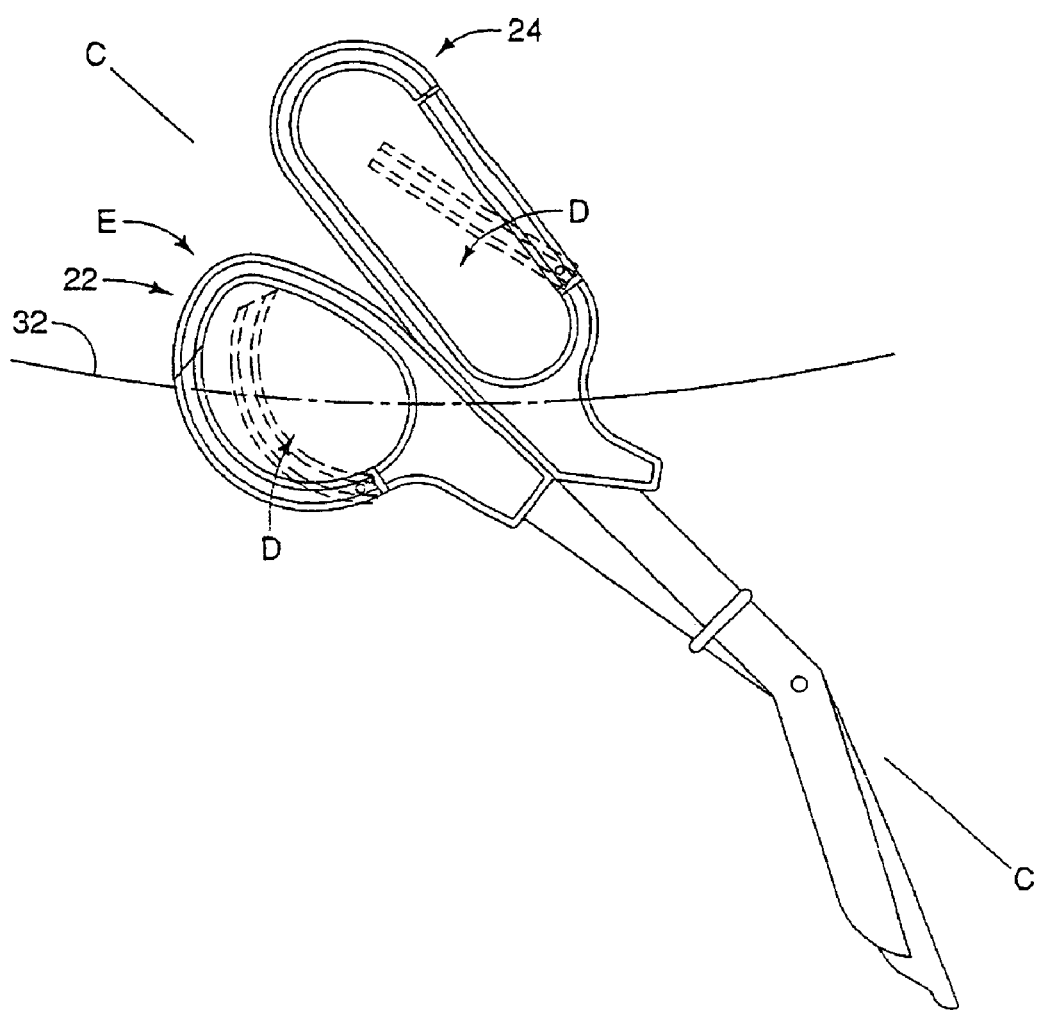
FIG. 2 is, in a front elevation closed position, the pair of scissors of FIG. 1 hooked onto a waistband.

A first end 12a and 14a respectively of each of said first and second levers 12 and 14 are formed as shearing or cutting blades having cutting edges along opposed facing edges of the first and second levers respectively. The cutting edges are for shearing engagement of one of the cutting edges over the other as the levers are rotated towards each other in directions A relative to one another about the fulcrum, that is about pivot point 16, between an open position such as seen in FIG. 1 wherein the cutting edges form a V-shaped nip 18 for receiving in the nip 18 in direction B an object 20 to be cut, and a closed position such as seen in FIG. 2 wherein the cutting edges substantially overlap one another so as to close the nip 18 along the length of said blades.

A second end 12b and 14b respectively of each of the first and second levers 12 and 14, opposite the first ends 12a and 14a, are formed as handles. The handles include a pair of corresponding loops 22 and 24 lying substantially adjacent a plane C common with the cutting edges when in the closed position and lying substantially in a plane of rotation of the levers when rotated about the fulcrum. Each loop has a substantially contiguous surface surrounding an inner circumference of the loop. In the embodiment of the scissors of FIG. 1 where the clip in the handle is a carabiner, a corresponding gate 26 is shown in the closed position in each loop. Gates 26 are shown in their open position in dotted outline. When a gate 26 is opened by rotation in direction D an opening 30 is formed into the loop through the corresponding discontinuity in the inner circumference of the loop.

Each gate 26 may have a corresponding leaf spring (not shown) or the like or other resilient biasing means extending from the gate into the base shank 26a, 28a of the corresponding loop. Gates 26 only open inwardly of said loop, that is in direction D, about hinges 29, against a return biasing force of the resilient biasing means such as the leaf springs. The resilient biasing means cooperate with their corresponding gate 26 to resiliently urge gate 26 into the closed position, as illustrated, against a stop or lip 26b, 28b respectively formed in the corresponding loop.

Figure 3:
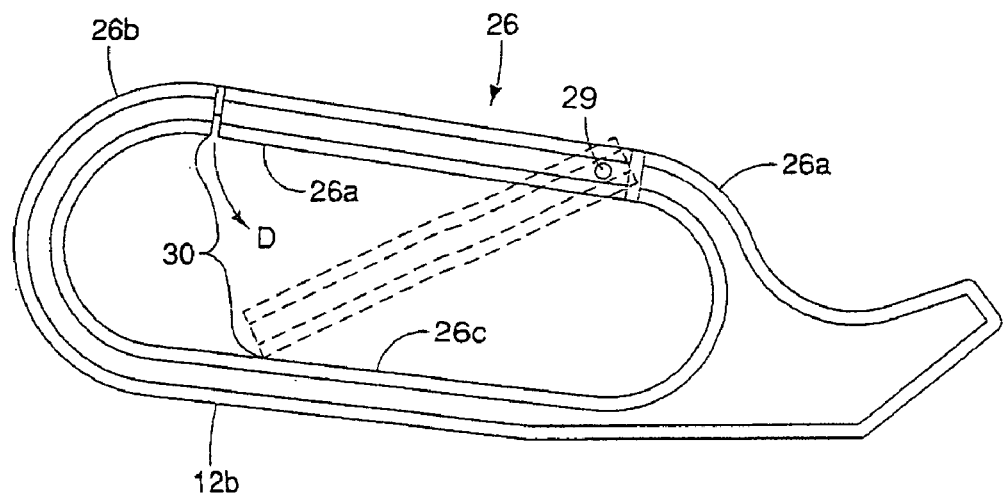
FIG. 3 is, in partially cut away enlarged view, the upper carabiner and handle of the pair of scissors of FIG. 2.
Figure 4:
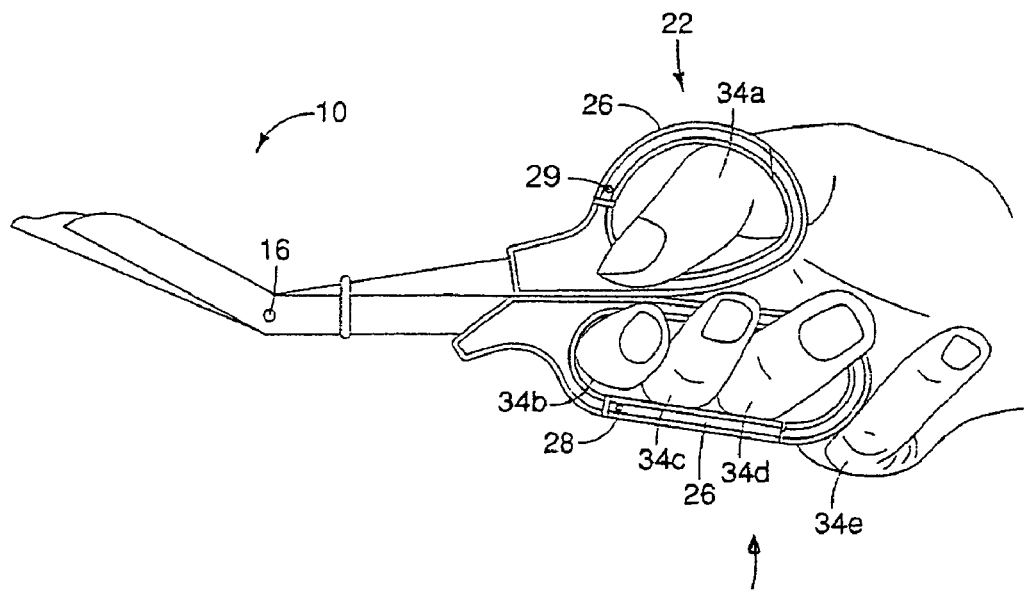
FIG. 4 is, in front elevation view, the scissors of FIG. 1 being grasped by a user of the scissors and with the carabiners in their closed position.

As seen in FIG. 3, which is an enlarged view of a representative loop such as loop 24, each loop may include a first bearing member and a second bearing member. The second bearing member is disposed oppositely on each loop from the first bearing member. The first bearing members 26c, 28c are closely adjacent when the levers 12, 14 are in their closed position. The second bearing members 26d, 28d are spaced apart from each other by the cumulative diameters of the pair of loops. In one embodiment a gate is formed in at least one of the second bearing members, that is, on the outer curvatures of the loops.

In one form of scissors, a first loop 22 of the pair of loops is adapted to only receive in somewhat snug sliding engagement journalled therethrough a thumb 34a of a first hand of a user. This is usually accomplished by sizing and shaping the thumb loop 22 to only comfortably receive thumb 34a. The opposite second loop 24 of the pair of loops is normally adapted to receive in sliding engagement journalled therethrough at least two fingers, for example fingers 34b, 34c, 34d of the first hand of the user 34. In one embodiment, the scissors only have a single gate and that gate is only formed on the second loop, that is only on the fingers loop 24, or only on the first loop, that is only on the thumb loop 22.

Each gate 26 includes an elongate gate member pivotally mounted by hinges 29 to the base shanks 26a, 28a. Each hinge 29 is advantageously disposed as illustrated on an end of the gate closest to pivot joint 16 so that a distal end of the gate member distal from the hinge is disposed oppositely from pivot joint 16.

Thus in use, scissors 10 may be grasped by a single hand of a user, for example about the mid point along the closed blades and one of the loops, for example loop 22 as illustrated, driven in direction E onto waistband 32a (shown in dotted outline) of a pair of hospital scrubs 32, belt, belt loop, webbing, etc. This pushes lip 32 into the opening 30 formed as gate 26 on loop 22 opens, that is, pivots about hinge 29 as a result of the force of engaging against the waistband. Once the scissors and gate are released from the grasp of the user the gate springs back towards its closed position pinching the waistband and securing the scissors, from where they may be easily later retrieved.

Figure 5:
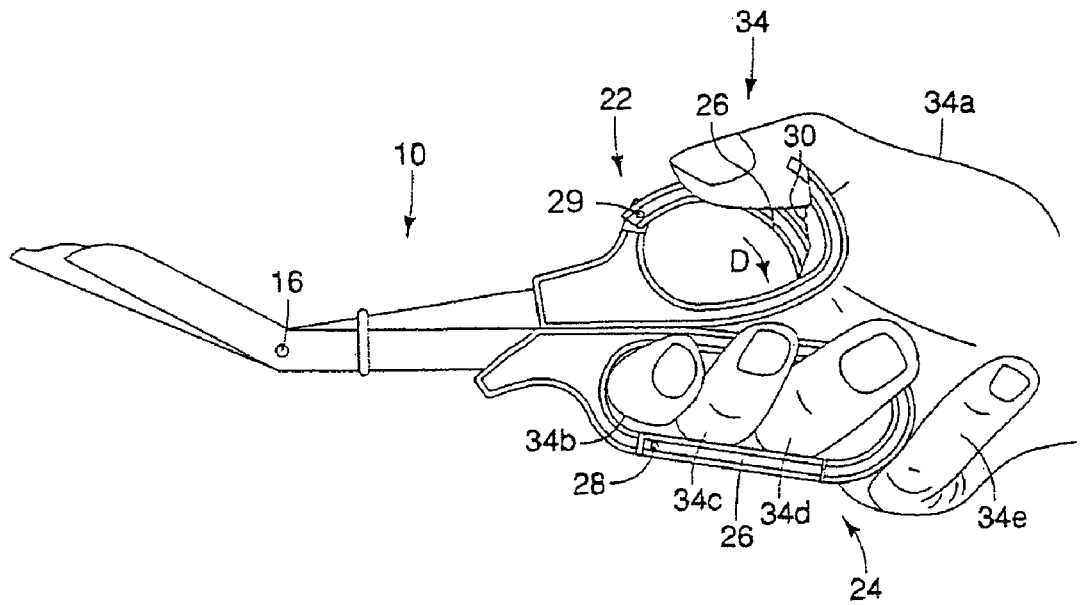
FIG. 5 is the view of FIG. 4 with the carabiner on the thumb handle being opened by the user's thumb.

Alternatively, for single-handed use as illustrated in FIG. 5, the user may, leaving one or more fingers 34b-34e in loop 24, remove thumb 34a from loop 22, place thumb 34a on the corresponding gate 26 and apply force in direction D against that gate thereby driving the gate inwardly into loop 22 creating opening 30. Loop 22 may then be driven in direction E onto a waistband 32a as illustrated in FIG. 2, or onto any other suitable receptacle such as pockets, the sides of stretchers, and on cables in the emergency room or operating room, and on emergency vehicles and equipment, allowing scissors 10 to be clipped-on with one hand while leaving the other hand free.

Figure 6:
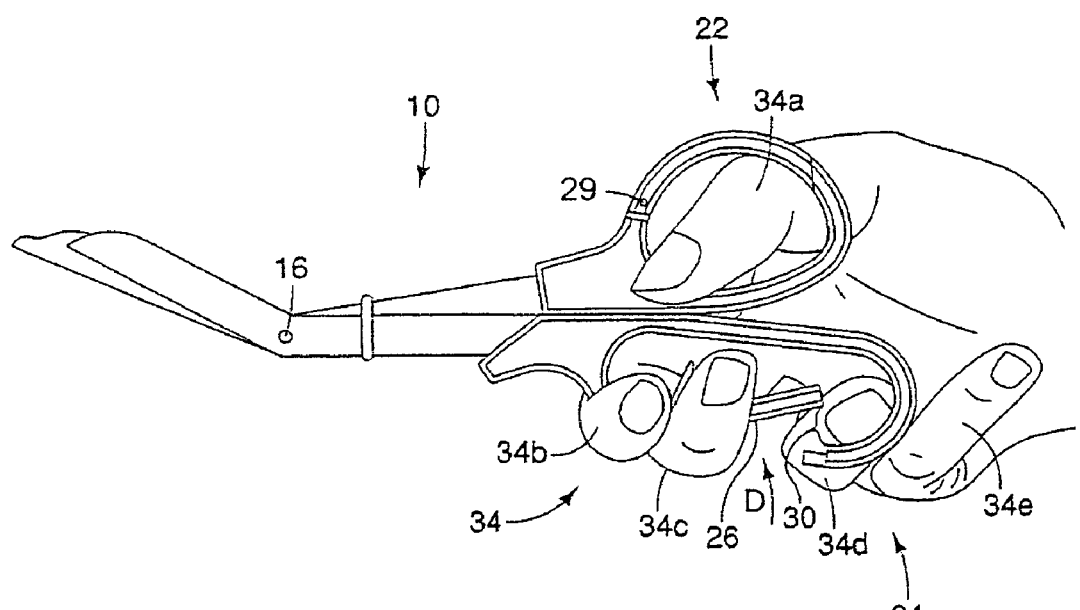
FIG. 6 is the view of FIG. 4 with the carabiner of the finger handle being opened by the user's fingers.
Figure 8:
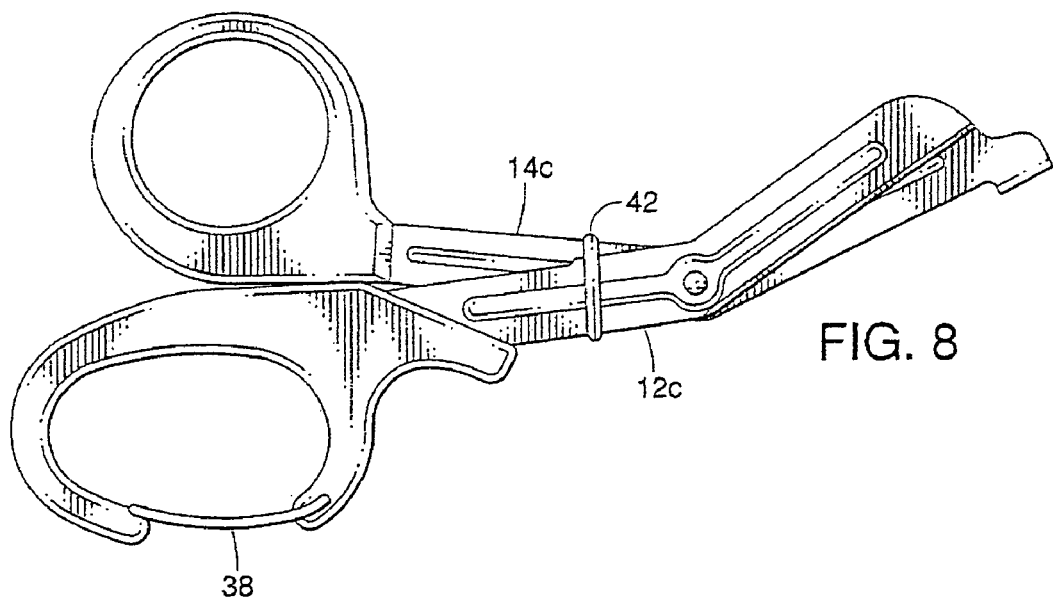
FIG. 8 is, in right side elevation view, the scissors of FIG. 7.

In a further alternative use of the present invention, the user may leave thumb 34a in loop 22 and remove one or more of fingers 34b, 34c, 34d and 34e and place such finger(s) on the corresponding gate 26 of loop 24. Without intending to be limiting, FIG. 6 illustrates fingers 34c and 34d which are removed from the inside of loop 24 and placed on gate 26. When fingers 34c and 34d apply force in direction D against that gate it is driven inwardly into loop 24 creating opening 30. Loop 24 may then be driven in direction E onto a lip 32 of an open pocket, or any other suitable receptacle thereby allowing scissors 10 to be stored with one hand while leaving the other hand free.

In the alternative embodiment of FIGS. 7-15, again the scissor includes substantially linear elongate first and second levers mounted to one another by a pivot joint so as to form a fulcrum substantially mid-way along their lengths. The first ends of each of the first and second levers are formed as shearing or cutting blades having cutting edges along opposed facing edges of the first and second levers respectively. The second ends opposite to the first ends are again formed as handles. In this embodiment, although not intended to be limiting, a single wire-frame carabiner 38 is mounted in a corresponding aperture formed in one of the handle loops. Although only illustrated as a single wire-frame carabiner it is understood that the invention is not so limited and that wire-frame carabiners or other clips may be formed in the opposite sides of both handle loops of the shears.

Figure 7:
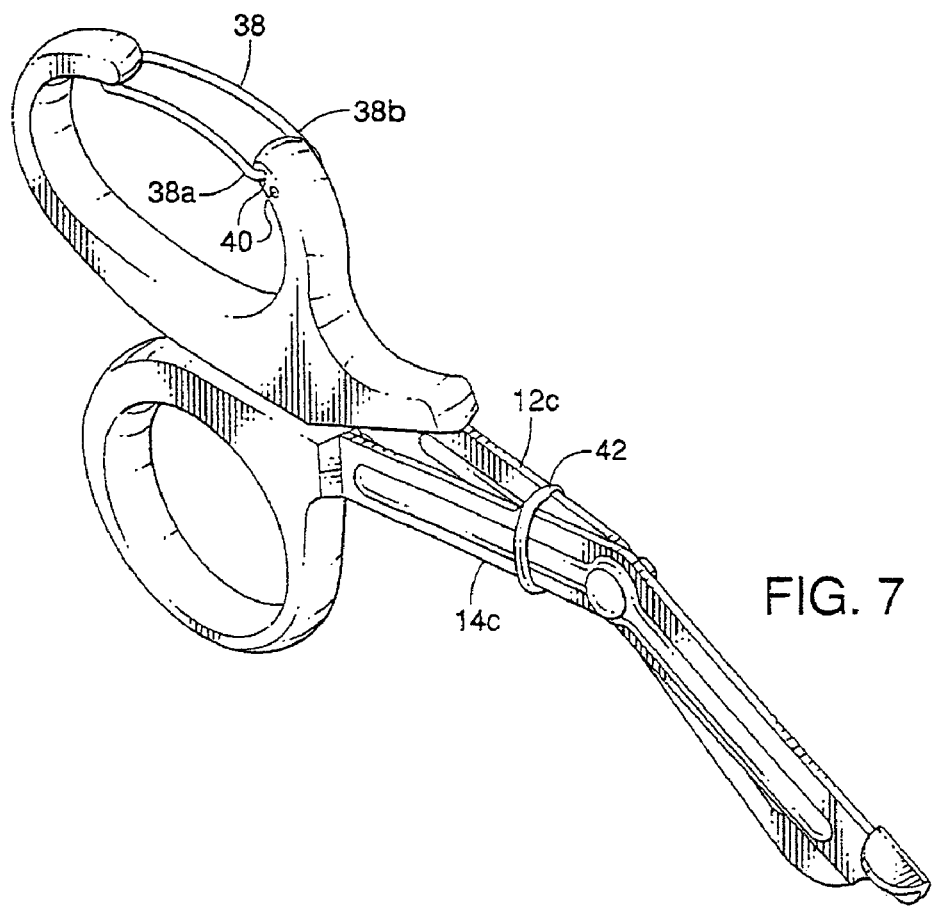
FIG. 7 is, in perspective view, an alternative embodiment of the scissors according to the present invention with the carabiner in the closed position.
Figure 7A:
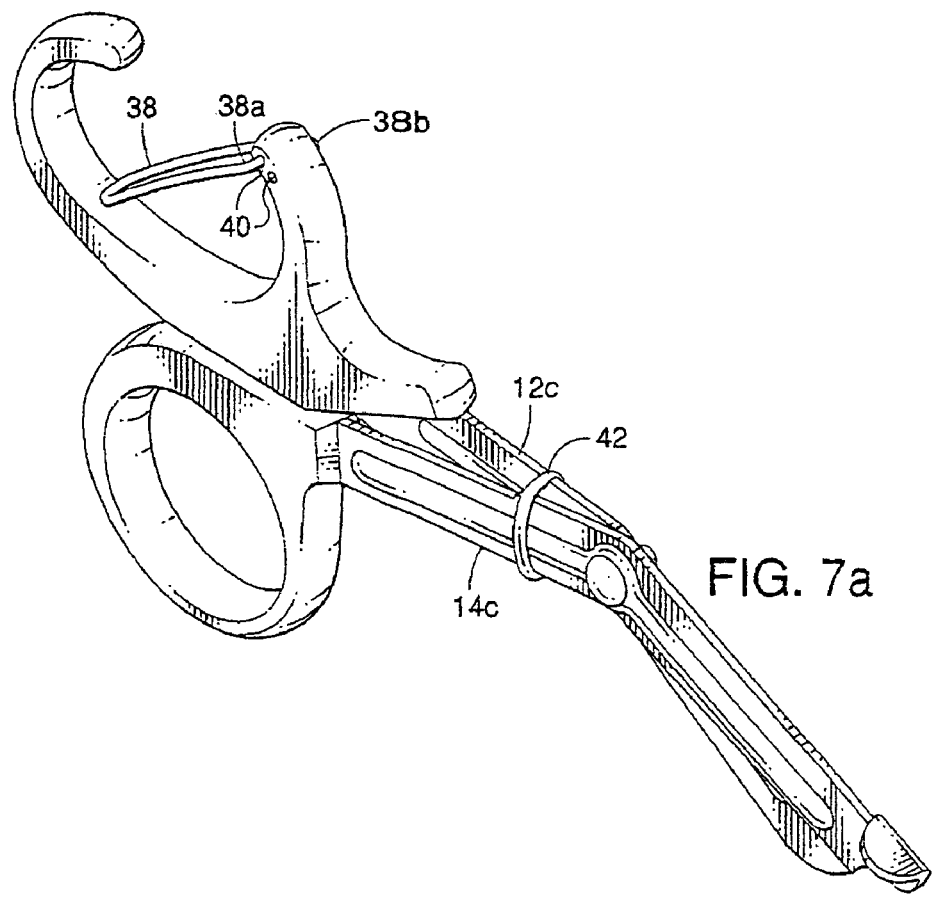
FIG. 7a is the view of FIG. 7 with the carabiner in the open position.
Figure 8A:
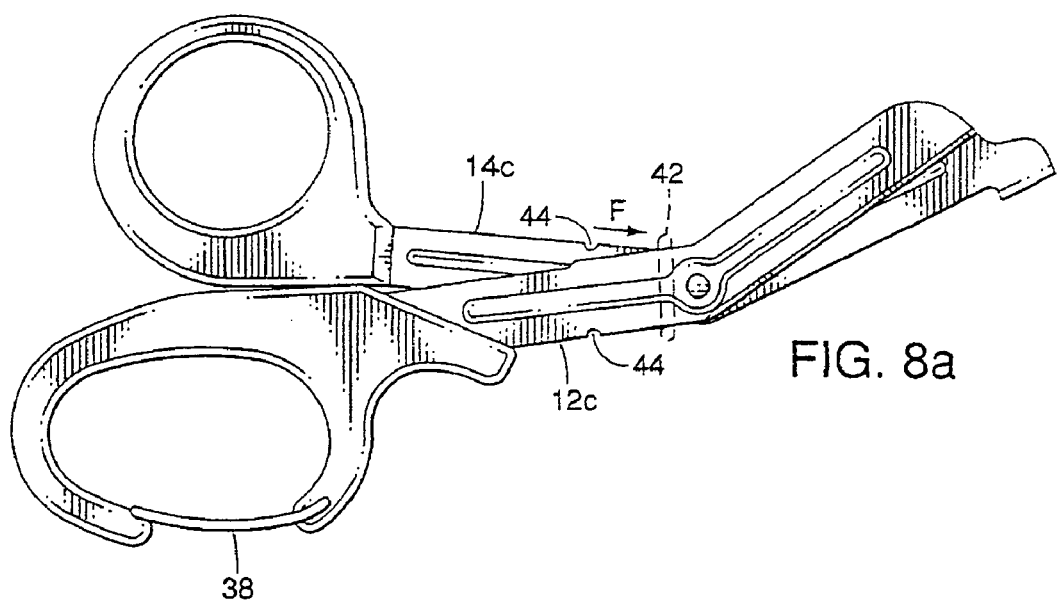
FIG. 8a is the view of FIG. 8 with the O-ring rolled forward along the handle stems toward the pivot joint of the blades.
Figure 14:
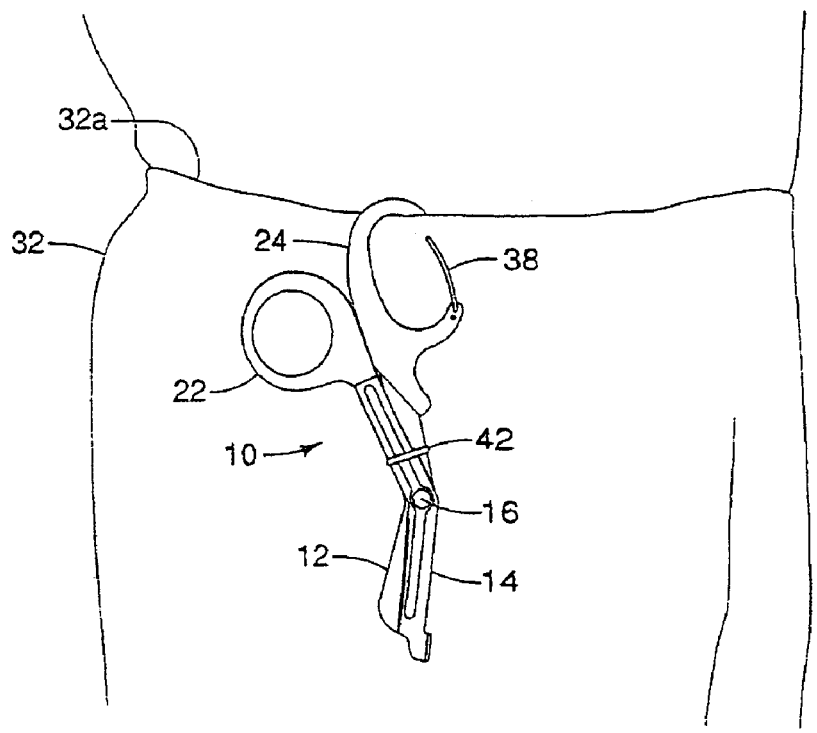
FIG. 14 is, in side elevation, the scissors of FIG. 7 hooked onto the waistband of a pair of hospital scrubs, with the resilient loop on the stems of the scissor handles urging the scissors closed for safety carrying the scissors.
Figure 15:
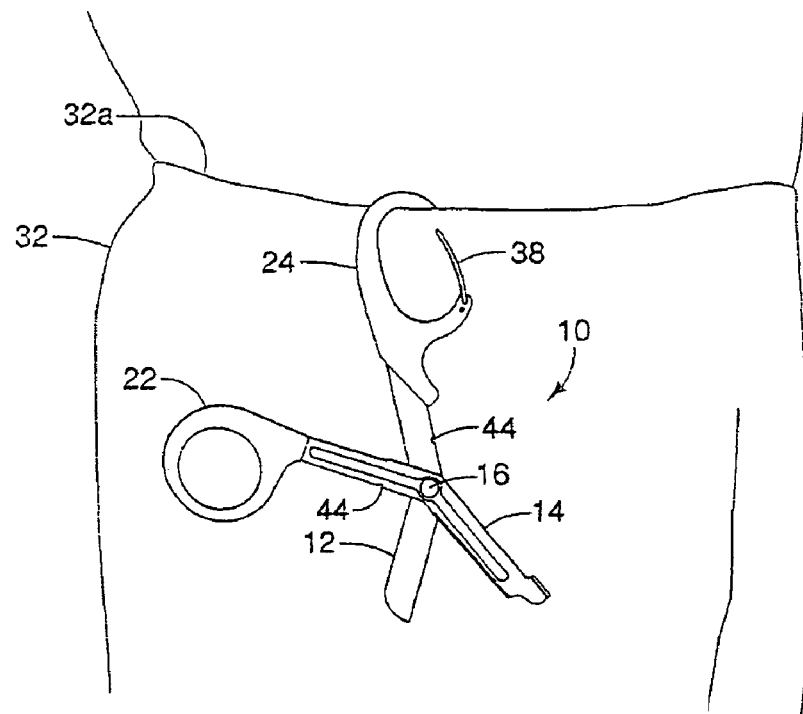
FIG. 15 is the view of FIG. 14 with the resilient loop removed from the scissors and the scissors consequently hanging with the blades open while the scissors are being carried.

The wire-frame carabiner is formed in a u-shape. The ends 38a and 38b of the u-shape of wire-frame carabiner 38 are mounted in a pair of corresponding bores 40 formed in the handle so that the ends 38a and 38b are off-set or staggered relative to one another. In this fashion, when wire-frame carabiner 38 is deflected inwardly of the loop so as to open the carabiner in the manner depicted in FIG. 7a, deflection is such that wire-frame carabiner 38 is resiliently deformed against a return-biasing spring-force due to the deflection. Thus wire-frame carabiner 38 may be pushed inwardly, and once released, springs closed to close the carabiner across the opening into the loop handle.

As also seen in the alternative embodiment of FIGS. 7-15, a resilient band such as a resilient loop of which an O-ring 42 is one example is mounted over the handle stems adjacent the pivot joint, for example in corresponding semi-circular notches 44 formed in the edges 12c and 14c of the handle stems substantially intermediately between the handle loops and pivot joint. The resilient band or loop, and in particular O-ring 42 provides a resilient biasing force biasing the scissors into the closed position illustrated. Thus as the handle loops are separated to thereby open the nip between the blades, O-ring 42 is elastically stretched. Once the opening force on the pair of handle loops is released by a user, the return biasing force of the resilient band, for example that of O-ring 42 mounted in notches 44, urges the blades and stems to close as they pivot about the pivot joint as O-ring 42 resiliently returns to its undeformed state.

Thus when a user is carrying the scissors, for example clipped to a waistband using the carabiner or other clip formed in one of the handle loops, the O-ring helps keep the scissors closed. This provides for ease of storage of the scissors and improved safety in that the scissors do not inadvertently fall open when hanging by the clip. When it is desired to use the scissors in a medical emergency, that is, in situations where free use of the scissors without the return biasing force of the O-ring being present may be advantageous, the O-ring may be either manually rolled forward to the pivot joint in direction F, or may be forced in direction F by the user initially opening the scissor handles to their most open position thereby stretching the O-ring and causing it to slip out of the semi-circular notches holding it in place on the handle stems. Thus the O-ring may be disabled and moved to its storage position adjacent the pivot joint by a one-handed movement. Being able to do this with merely one hand may be important in a medical emergency. Once the O-ring slips from the notches the contraction of the O-ring forces it along the converging edges of the handle stems until it comes to rest against the pivot joint. When the medical emergency has passed the scissors may be returned to their secure storage by sliding the O-ring back into the notches and clipping the scissors using the carabiner or other clip provided on the handle.

In alternative embodiments, the resilient band, one example of which is O-ring 42 described above, may be either round or cylindrical in shape. For example the resilient band may be a rubber collar (not shown) or other resilient collar, or may be a resilient sleeve (not shown), for example made of rubber or neoprene, etcetera. The collar or sleeve may be maintained in place on the handle stems (so as to close the scissors) by one edge or end of the collar or sleeve respectively nudging up against pivot joint 16. When a user forcefully opens the scissors the collar or sleeve will slide or roll onto the pivot joint, or the user may just push the collar or sleeve onto the pivot joint, so that the scissors can be operated substantially free of the resilient closing force of the resilient collar or sleeve.

Figure 16:
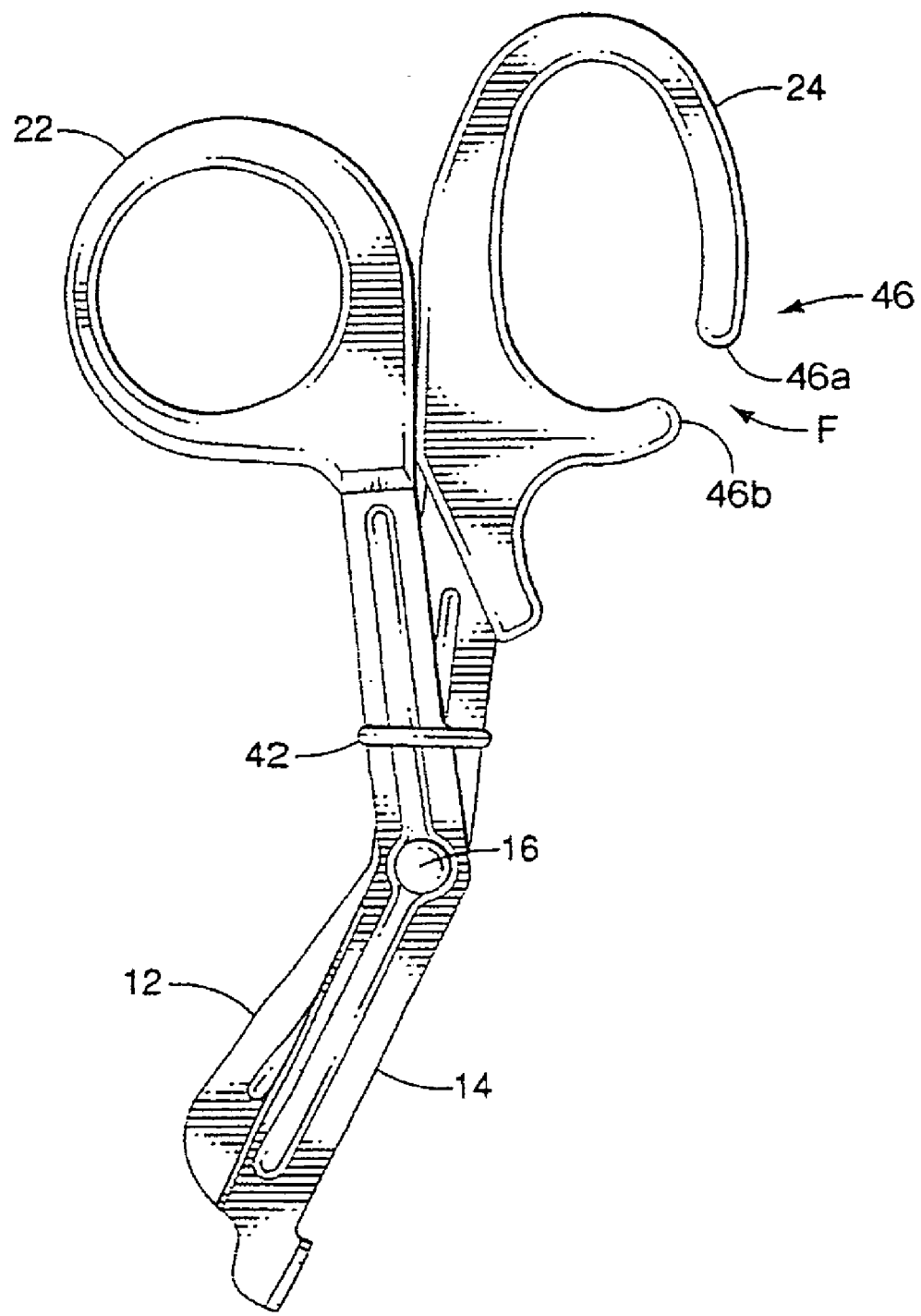
FIG. 16 is, in side elevation, and alternative embodiment of the scissors according to the present invention.
Figure 17:
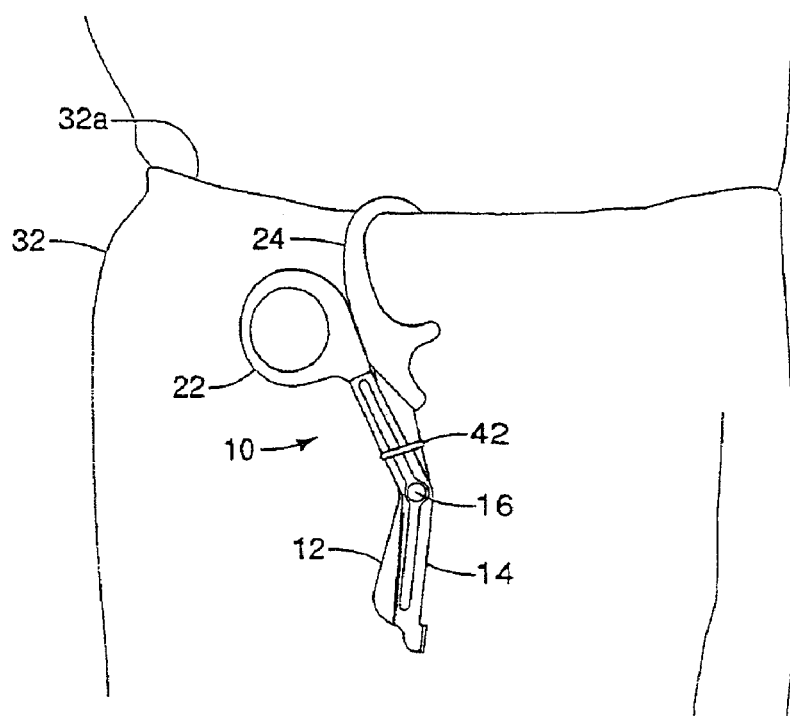
FIG. 17 is, in side elevation, the scissors of FIG. 16 hanging, clipped to the waistband of a pair of hospital scrubs.
Figure 18:
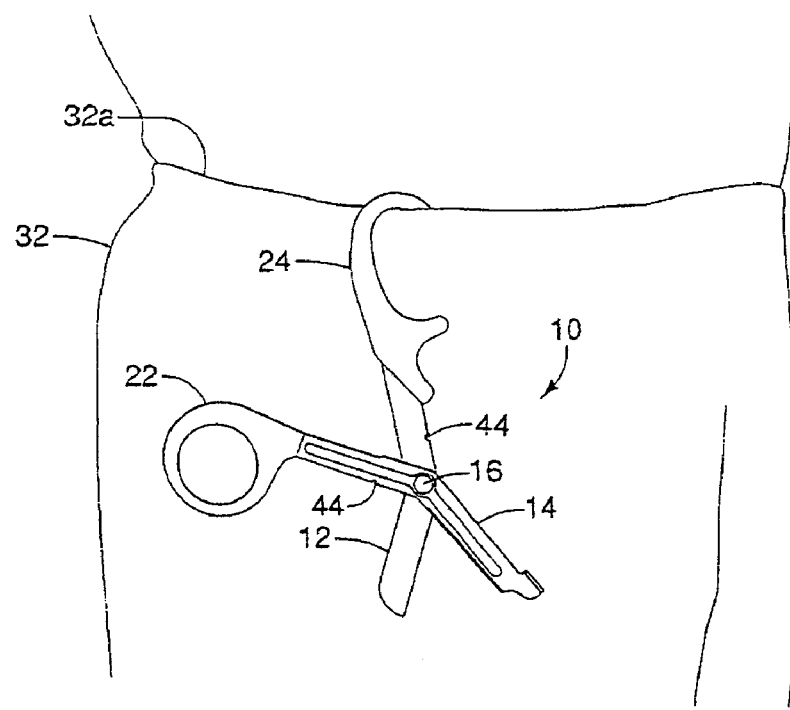
FIG. 18 is the view of the FIG. 17 with the O-ring removed from the scissors and the scissors hanging open while being carried.

In the embodiment of FIGS. 16-18 the clip 46 in the handle loop 24 is formed by leaving a small opening between the stub-portion 46b and an elongate flexible portion 46a of the handle loop. The small opening may for example have an opening dimension in the order of the thickness of the flexible portion 46a as illustrated, or may be smaller (for example so that the ends of portions 46a and 46b meet or substantially meet, or are adjacent), or may be longer so long as the elongate portion 46a forms a resilient clip. The resilient clip serves, as do the carabiner clips described above, to hang scissors 10 from, and store scissors 10 on a, waistband for example. In the waistband example, the waistband 32a is pushed in direction F through the opening between portions 46a and 46b so as to resiliently pop through the opening. The resilient clip allows the removal of the waistband back through the opening upon a user tugging the scissors upwardly. However, preferably the opening is sufficiently small relative to the waistband, or other item being clipped onto, so that the waistband or other item won't easily inadvertently pass through the opening.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A pair of clip-handle scissors comprising:
    substantially linear elongate first and second levers mounted one to the other by a pivot joint so as to form a fulcrum substantially mid-way along their lengths,
    a first end of each of said first and second levers formed as shearing blades having cutting edges along opposed facing edges of said first and second levers respectively for shearing engagement of one of said cutting edges over the other as said levers are rotated relative to one another about said fulcrum between an open position wherein said cutting edges form a V-shaped nip for receiving in said nip an object to be cut, and a closed position wherein said cutting edges substantially overlap one another so as to close said nip along the length of said blades,
    a second end of each of said first and second levers, opposite said first ends, formed as a pair of handle stems having handle loops at distal ends thereof and lying substantially adjacent a plane common with said cutting edges and containing a plane of rotation of said levers when rotated about said fulcrum, and wherein a clip is formed in at least one of said loops, said clip forming an opening into said loop through a discontinuity in said inner circumference of said loop when said clip is resiliently urged into an open position,
    wherein a pair of semi-circular notches are formed in opposite edges of said pair of handle stems and spaced from said pivot joint and wherein a resilient loop is mounted tensioned around said pair of handle stems and seated in said pair of semi-circular notches so as to resiliently bias said first and second levers into said closed position
    and wherein when said levers are in their most open position said resilient loop is stretched to thereby cause said resilient loop to slip out of said semi-circular notches, disabling said biasing of said levers into said closed position, and moving said resilient loop to a storage position adjacent said pivot joint, whereby said disabling of said biasing of said levers into said closed position is accomplished by a one-handed movement by a user.

2. The scissors of claim 1 wherein said resilient loop is at least one O-ring.

3. The scissors of claim 1 wherein a first loop of said handle loops is adapted to only receive in sliding engagement journalled therethrough a thumb of a first hand of a user and wherein a second loop of said handle loops is adapted to receive in sliding engagement journalled therethrough at least two fingers of the first hand of the user, and wherein said clip is only formed in only said second loop.

* * * * *